(No Model.) 2 Sheets—Sheet 1.

A. CALDWELL.
AGRICULTURAL IMPLEMENT.

No. 486,849. Patented Nov. 29, 1892.

Witnesses
John Buckler,
Isabel Chester.

Inventor
A. Caldwell,
By his Attorney
A. M. Pierce.

(No Model.) 2 Sheets—Sheet 2.

A. CALDWELL.
AGRICULTURAL IMPLEMENT.

No. 486,849. Patented Nov. 29, 1892.

Witnesses
Jno. Buckler
Isabel Chisler

Inventor
A. Caldwell
By his Attorney
A. M. Pierce.

UNITED STATES PATENT OFFICE.

ALEXANDER CALDWELL, OF ESSEX, IOWA.

AGRICULTURAL IMPLEMENT.

SPECIFICATION forming part of Letters Patent No. 486,849, dated November 29, 1892.

Application filed November 5, 1891. Serial No. 410,967. (No model.)

*To all whom it may concern:*

Be it known that I, ALEXANDER CALDWELL, a citizen of the United States, residing at Essex, in the county of Page and State of Iowa, have invented new and useful Improvements in Agricultural Implements, of which the following is a specification.

My invention relates especially to stubble, corn, and similar plows intended for either riding or walking, and has for its object the provision of an implement adapted to all kinds of soil, which may be used either as a right-hand or left-hand plow at the pleasure of the operator, which will readily adapt itself to the character of the work to be performed, which will operate in a highly-effective manner, and having about one-half the draft of similar plows heretofore used.

To attain the desired end, my invention consists, essentially, in a two-wheeled tongued plow having a low plowshare and a shim-piece running the usual height up the beam, said plow having no mold-board, but being provided with a disk in the rear and slightly to one side of the share, standing obliquely and acting as a mold-board. I also employ a circular cutter as a subsoiler in the rear of the shim-piece; and my invention also involves certain other novel and useful combinations or arrangements of parts and peculiarities of construction and operation, all of which will be hereinafter first fully described, and then pointed out in the claims.

Figure 1:
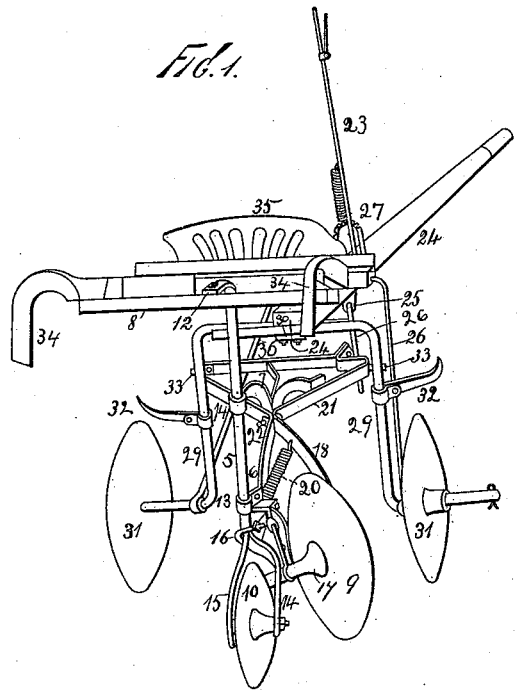
Figure 2:
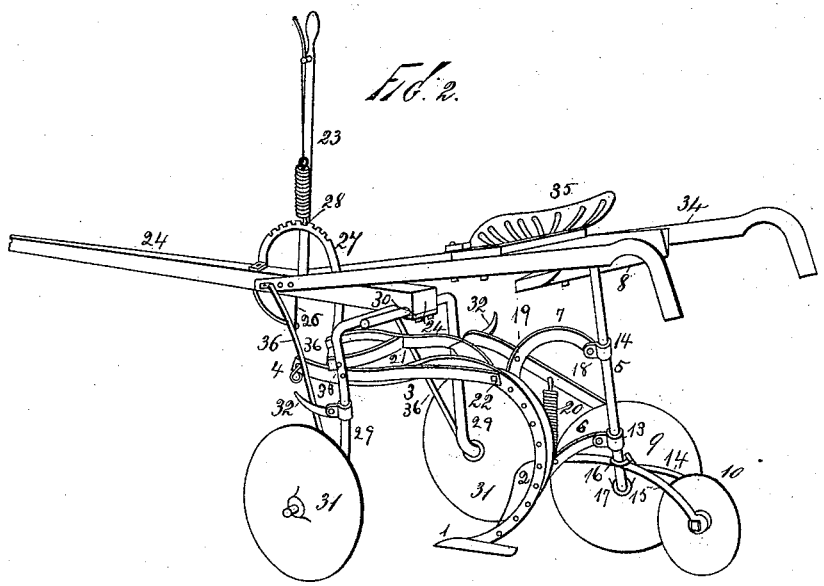
Figure 3:
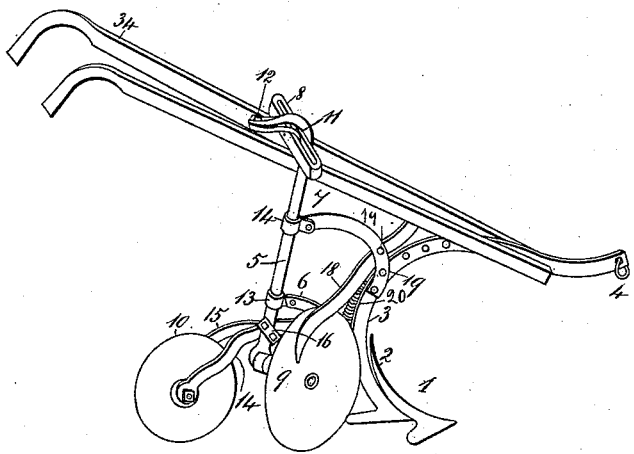

In the accompanying drawings, Figure 1 is a rear view of my improved implement. Fig. 2 is a side elevation thereof, and Fig. 3 is a side view of the plow mechanism detached from the remainder of the implement and adapted for walking.

Similar numerals of reference, wherever they occur, indicate corresponding parts in all the figures.

1 is the plowshare of skeleton form, consisting of a narrow share without any mold-board, but having a shim-piece 2 curving upward and backward toward the beam, said shim-piece being a continuation of the share from the point thereof.

3 is the beam, made of steel, passing from 
beneath the share, curving upward and backward therefrom at the rear of the shim-piece 2, over the same and forward to the clevis 4, with which a doubletree is connected when the implement is in use. In my construction the plow-beam is about fourteen inches shorter than those in general use—a saving both in material and weight—and gives a better draft purchase.

5 is the standard, consisting of a metal rod, preferably one and one-eighth inches in diameter, running through spring-steel clutches 13 and 14, mounted upon supports 6 and 7, connected to the plow-beam and to a cross-bar 8 upon the implement frame. This standard 5 supports the disk mold-board 9 and the circular cutter or colter 10. Standard 5 bends at a right angle near the upper extremity and engages with a plate 11, as particularly illustrated in Fig. 3, and said plate in turn engages with cross-piece 8, which is provided with a longitudinal slot for its reception. A bolt 12 permits the adjustment of the standard to the right or left, which movement throws the mold-board disk either to the right or left to a greater or less angle, as may be required by the work to be performed. The colter 10, consisting of a circular disk, is mounted upon an axle passing through brace-bars 14 and 15, the bar 15 being straight and 14 being curved to the right for a right-hand plow and to the left for a left-hand plow. The bar 14 is slotted at its front end, so that it may be adjusted forward and back to throw the disk to and from the land. 16 is a clevis or clamp for adjustably securing the brace-bars 14 and 15 to the standard 5. This disk cutter acts as a subsoiler. By having the concave surface to the landside the plow may be used as a corn-plow. Plowing with the landside to the corn or other crop being cultivated, the forward disk 9 will throw weeds and other rubbish from the crop, and then the cutter-disk 10 will throw the deeper clear soil directly to the crop. I have shown this cutter 10 as in the form of a disk; but when found desirable a straight cutter might be substituted therefor.

The mold-board disk 9 is concave to the right in a right-hand plow and to the left in a left-hand plow—that is, concave toward the plowed ground—and the concave side of the disk is made without a hub, as it is desirable that there shall be no obstruction to the free movement of the soil over the concave surface. The hub 17 is on the convex side of the disk—the side toward the standard 5.

18 is a spring-steel cleaner designed for keeping the mold-board disk free from dirt. It is bolted to the brace 7 at 19 and connected by a spiral spring 20 to the lower brace 6, as particularly illustrated in Fig. 2 of the drawings. This spring holds the cleaner in place against the disk, while allowing the requisite amount of play. The lower extremity of the cleaner is somewhat knife-shaped, and the upper end of the cleaner-bar projects in such a manner that it may be operated by the foot of the user of the implement, if desired.

The main frame 21 is used when the truck is employed, but is dispensed with when the truck is not used, as in Fig. 3. It is made of flat wrought-iron. The rear part of said frame is bolted to the beam, as at 22.

23 is a lever-arm mounted upon the tongue 24 and pivoted at the side thereof, the lower extremity curving backward and terminating in an eye 25. This lever is connected to the frame 21 by a link 26, and may be adjustably secured in place by means of a notched segment 27 and spring-bolts 28 in the well-known manner, the office of said lever being to raise and lower the plow.

The truck-arch is composed of two metal bars 29, both bent in such a manner as to form double cranks, the inner and upper extremities passing through a casting 30, bolted to the inner end of the tongue 24, permitting the proper adjustment. The lower and outer cranks form the axles for the truck-wheels 31. Said wheels are preferably made flat, three-eighths of an inch thick, and eighteen inches in diameter; but these dimensions may be varied.

32 are foot-rests for the driver, and 33 are bolts connecting the main frame and the truck-arch.

The tongue 24, the handles 34, and the connecting cross-bars are the only parts of the implement constructed of wood. The seat 35 is of metal. The cross-bar 8 is slotted and bolted to the handles, so that the said handles may be thrown apart or drawn together in the usual manner. The handles have a series of holes therethrough, by which the cross-piece 8 may be varied in position for the purpose of lowering or raising the point of the plow.

36 are brace-rods passing from the axles forward and upward, as shown.

Having now fully described my invention, what I claim as new therein, and desire to secure by Letters Patent, is—

1. The combination, with the skeleton plow, of the beam thereof, supports 6 and 7, projecting from said beam, and a standard passing through said supports and carrying a rotatable disk, substantially as shown and described.

2. In an implement of the character herein specified, the combination, with the skeleton plow, of the disks 9 and 10, arranged the disk 10 behind the disk 9, substantially as shown and described.

3. In an implement of the character herein specified, the combination, with the standard 5, bearing a revoluble disk 9, of the adjustable frame carrying the disk 10, substantially as shown and described.

4. In a device of the character herein specified, the combination, with the tongue, truck-arch, supporting-wheels, and the main frame 21, adjustably supported therebeneath, of the skeleton plow, standard 5, and the disks 9 and 10, substantially as shown and described.

5. In an implement of the character herein specified, the combination, with the supports 6 and 7, carried by and extending rearwardly from the plow-beam, of the standard 5, bearing a disk 9, said standard being made adjustable, whereby the angle of rotation of the disk 9 may be varied, substantially as shown and described.

6. In an implement of the character herein specified, the combination, with the skeleton plow and the beam thereof, of the supports 6 and 7, the standard 5, and the cross-bar 8, said cross-bar being made adjustable forward and backward, substantially as and for the uses and purpose set forth and described.

7. The combination, with the standard 5, of the straight bar 15 and curved bar 14, interchangeably connected to standard 5, and the rotatable disk mounted between said bars, substantially as shown and described.

ALEX. CALDWELL.

Witnesses:
   L. N. WILSON,
   H. C. BLEAKLEY.